March 6, 1956

E. HOYET 2,736,996

PLASTER APPLICATOR

Filed Dec. 19, 1951

INVENTOR.
EUGENE HOYET

BY
O. L. Spencer
ATTORNEYS.

March 6, 1956 — E. HOYET — 2,736,996
PLASTER APPLICATOR

Filed Dec. 19, 1951 — 4 Sheets-Sheet 2

INVENTOR.
EUGENE HOYET
BY
O. L. Spencer
ATTORNEYS.

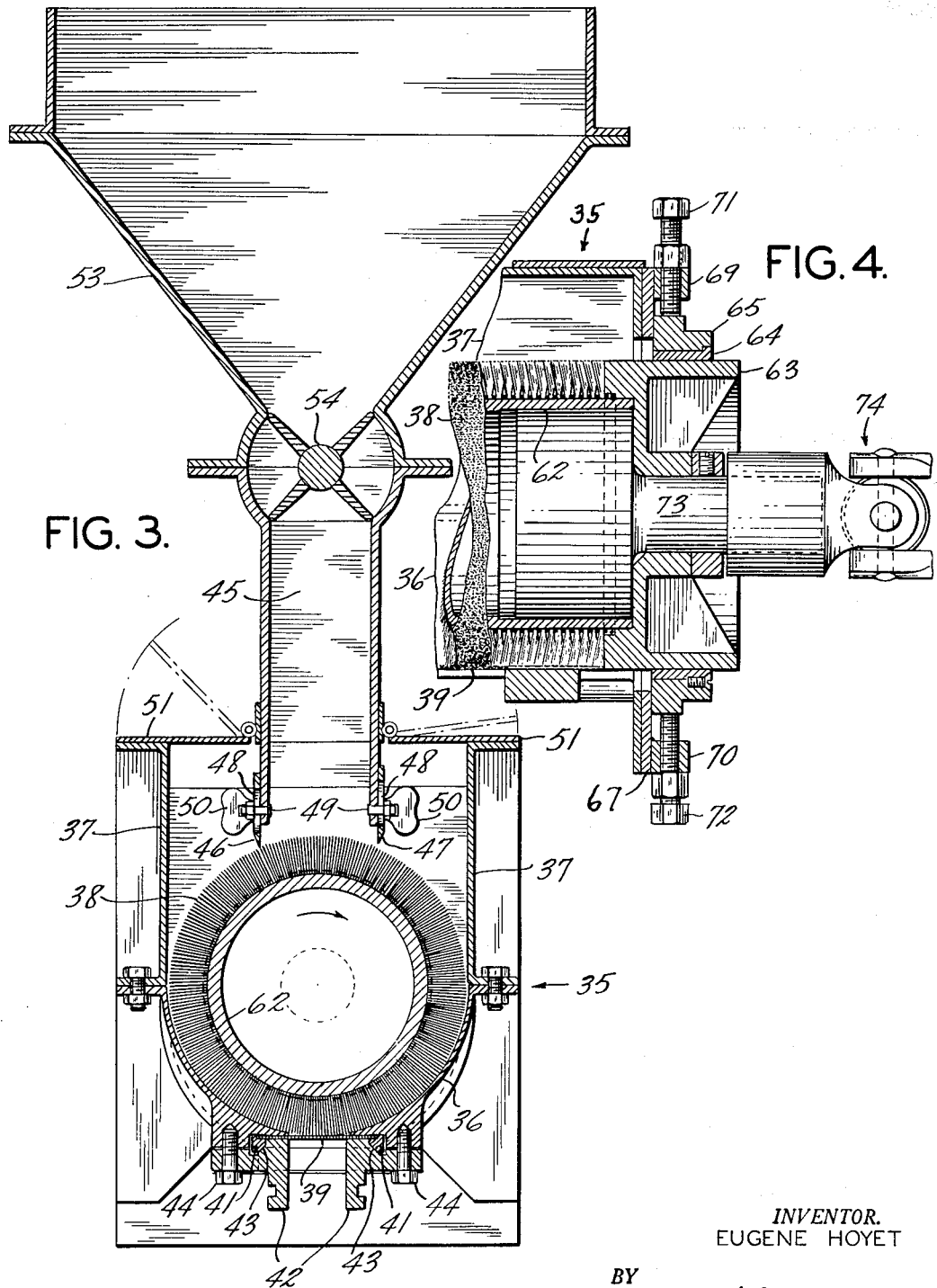

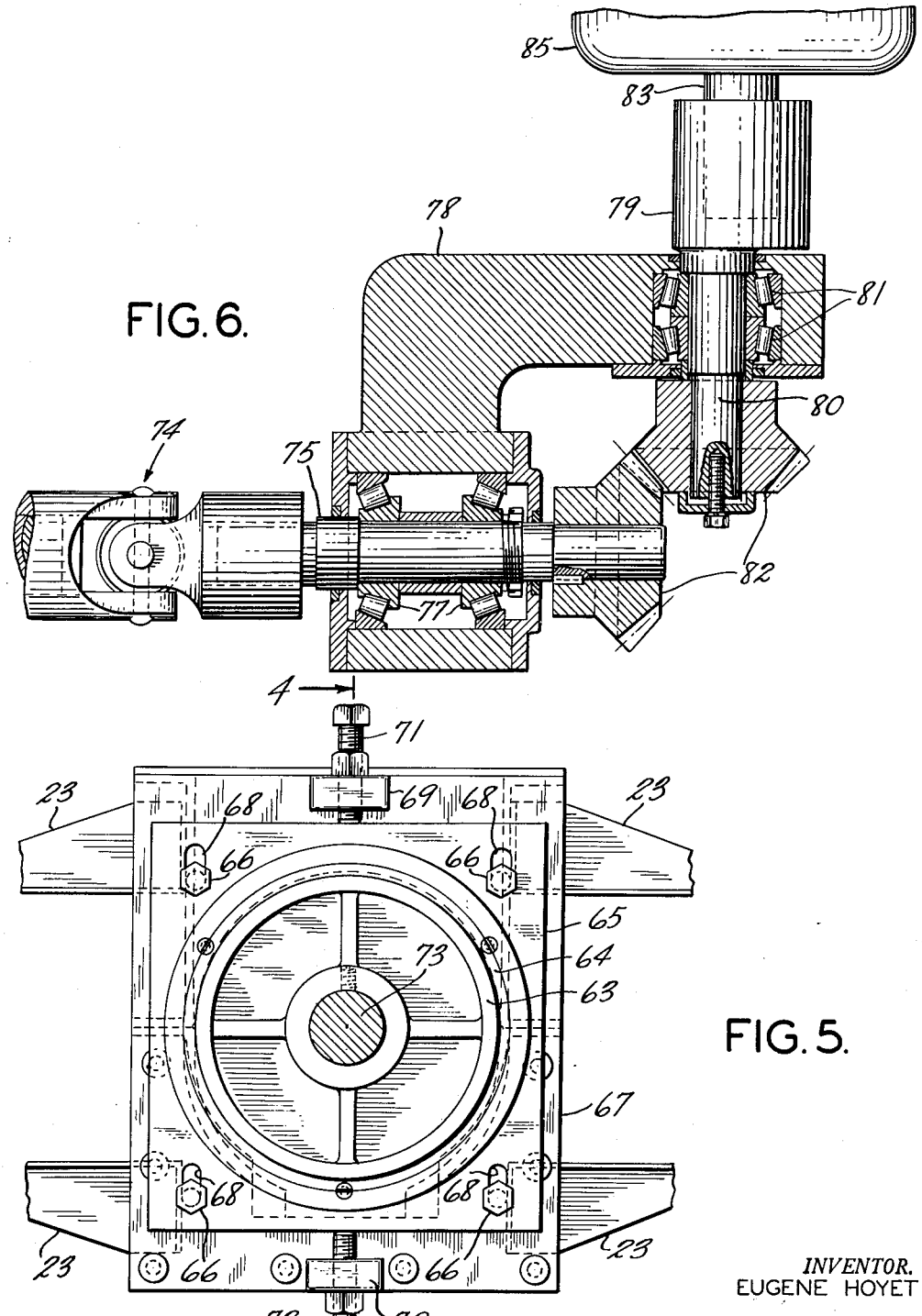

United States Patent Office 2,736,996
Patented Mar. 6, 1956

2,736,996
PLASTER APPLICATOR

Eugene Hoyet, Tarentum, Pa., assignor to Pittsburgh Plate Glass Company, Pittsburgh, Pa., a corporation Application December 19, 1951, Serial No. 262,415

26 Claims. (Cl. 51—262)

This invention relates to a method and apparatus for laying a bed of plaster on a horizontal surface. More particularly the invention relates to a method and apparatus for continuously laying a uniform thin bed of plaster on a succession of moving tables for receiving and holding large sheets of glass during the grinding and polishing operations in the continuous process manufacture of plate glass.

In the continuous process manufacture of the plate glass the grinding and polishing of the glass is performed on flat tables comprised of rectangular cars, usually made of cast iron, which are coupled together to form a continuous elongated surface of uniform width which may be something more than one thousand feet long. These cars are mounted for movement along tracks which are similar to railway tracks. The large sheets of glass are supported and held in a horizontal position on the grinding and polishing tables by means of thin beds of plaster of Paris, which is mixed with water and spread over the tops of the cars shortly before the sheets of glass are laid thereon. The plaster sets quickly and holds the glass firmly on the tables. The continuous line of cars carrying the sheets of glass passes beneath the grinding and polishing machines which finish the exposed upper surface of the glass. Thereafter, the glass and the plaster are removed from the tables, the glass is turned over to expose its unpolished surface, and the inverted sheets are reset in new supporting beds of plaster which have been spread upon the tables. The cars then pass beneath a second set of grinding and polishing machines to finish the exposed upper surfaces of the inverted glass sheets.

The bed of plaster which is applied to the tables need be only sufficiently thick to insure that at no place is there direct contact between the glass and the table. A few thousandths of an inch ordinarily will be adequate for this purpose. It is desirable that the plaster be applied uniformly over the table surface, so that the glass will be supported over its entire area and held firmly on the cars when the plaster sets.

Prior to the present invention it has been the practice to make a thin mixture of plaster of Paris and water, and then to spread this mixture manually on the grinding and polishing tables, using sprinkling devices which resemble garden sprinkling cans. The uniformity of the plaster bed thus formed depends on the skill and experience of the operator, and it is difficult to obtain a uniformly spread thin coating. This sprinkling operation is wet and messy and requires the men to wear rubber gloves and footwear. Even then it is common to see men with clothing wet and crusty with plaster. These undesirable working conditions have made it increasingly difficult to find men who are willing to perform this work, and have contributed to the creation of unfavorable employer-employee relationships.

It is an object of the present invention to provide a method and apparatus for applying the plaster bed mechanically to the grinding and polishing tables. It also is an object of the invention to provide a method and apparatus which handle the water and the dry plaster of Paris separately until the instant they combine on the table surface. A further object is to provide a method and apparatus which insure a thin plaster bed and increased uniformity of plaster thickness over the entire table surface. Another object is to provide a method and apparatus for continuously applying a plaster bed of uniform thickness to a succession of grinding and polishing tables. Another object is to provide apparatus for depositing a uniform layer of dry plaster of Paris onto previously wetted grinding and polishing tables. Still another object of the invention is to provide method and apparatus which will result in increased economy of operation. Other objects and advantages of the invention will appear hereinafter.

A preferred apparatus suitable for carrying out the method of the present invention has been selected for purposes of illustration and is shown in the accompanying drawings, wherein:

Figure 3 is a vertical section through the dry plaster of Paris applicator taken substantially on line 3—3 of Figure 1, but to larger scale;

Figure 4 is a view, partly in elevation, but mainly in longitudinal vertical section, through one end of the rotary brush of the dry plaster of Paris applicator, showing the driving connection therefor, this view being taken substantially on line 4—4 of Figure 5;

Figure 5 is a view taken substantially on line 5—5 of Figure 1, but to larger scale, showing the end bearing for the rotary brush and means for vertical adjustment of the brush;

Figure 6 is a view partly in plan and partly in horizontal section showing the driving connection for rotating the applicator brush and for simultaneously oscillating the brush along its longitudinal axis.

According to the present invention the water and the dry plaster of Paris are handled separately until they are brought into contact with each other on the grinding and polishing tables forming the tops of the cars. The water and the dry plaster of Paris are deposited continuously on the tables as the cars move along the track, successive increments of the moving tables being charged first with a measured amount of water uniformly distributed over the table surface, and then with a measured amount of dry plaster of Paris uniformly distributed over the wetted surface. The plaster bed thus formed on the table surface will be of uniform thickness, and since this thickness ordinarily need be only of the order of about .004 to .007 inch, no stirring or agitation of the mixture on the table surface is required to produce a bed of uniform consistency. Both the water and the dry plaster of Paris are deposited on the table mechanically, thus eliminating the operation of applying the plaster bed manually.

Figure 1:
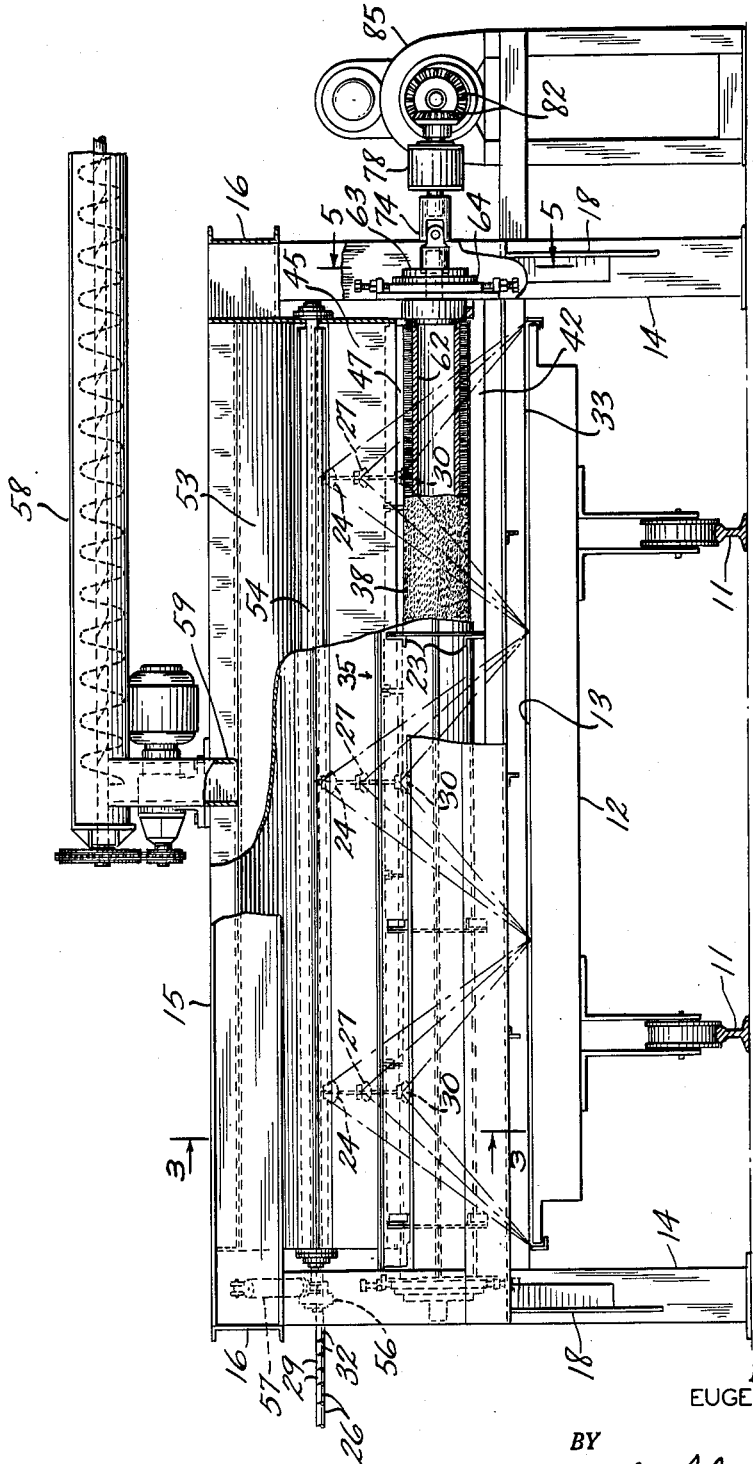
Figure 1 is an elevation of the machine from the side where the cars emerge after the plaster beds have been laid on the tables, portions of the structure being broken away in vertical section to disclose the construction and arrangement of the parts more clearly.
Figure 2:
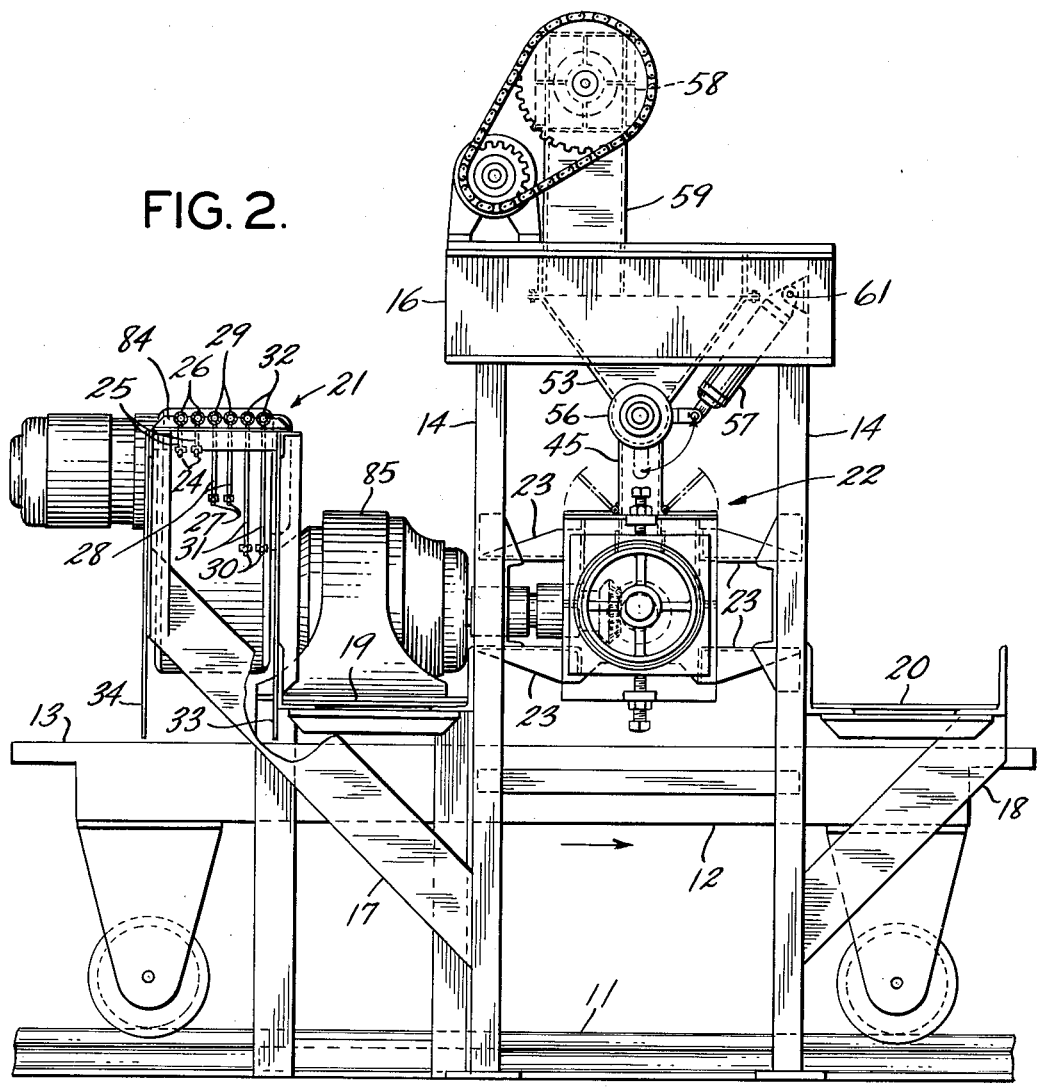
Figure 2 is an elevation looking toward the lefthand end of the machine as viewed in Figure 1, to somewhat lager scale than Figure 1.

Referring first to Figures 1 and 2 of the drawings, the means for charging the table surfaces successively with water and dry plaster of Paris are supported by a framework which extends over the track along which the cars move. The rails of the track are designated 11, and 12 denotes a car, the table top 13 of which is to have a thin bed of plaster deposited thereon for supporting and holding a sheet of glass firmly on the table. These tables may vary in size in different installations, depending on the size of the sheets of glass which are to be ground and polished, but ordinarily will be uniform in size in any particular installation. Merely by way of example they may be of the order of 10 to 12 feet on a side. The direction of car movement is from left to right in Figure 2, as indicated by the arrow. In operation, a series of these cars are coupled closely together to form a substantially continuous elongated surface of uniform width which advances at a uniform speed under the water and plaster applicators and then, after sheets of glass have been laid on the plaster beds, to the grinding and polishing apparatus. The speed of movement of the cars is dependent on a number of factors, but may be in the range of about 80 to 200 inches per minute.

Conveniently the framework for supporting the apparatus which deposits water and dry plaster of Paris on the tables is of welded steel construction. In the illustrative embodiment this framework comprises two upright members 14 on each side of the track. The members 14 are secured at their lower ends to the floor, and are joined at their upper ends by beams 15 spanning the track, and by shorter beams 16 parallel to the track. The apparatus for applying the dry plaster of Paris to the tables, indicated generally by the reference numeral 22, is mounted within this framework, supported by brackets 23 secured to cross members so that it is spaced a short distance above the top surface of the advancing tables. The apparatus for applying the water to the tables, designated generally by the reference number 21, is shown at the lefthand side of Figure 2, supported by the beams 17 which are secured at their lower ends to two of the uprights 14 and project outwardly and upwardly therefrom. Between the water applicator 21 and the uprights 14, spanning the table top and supported by the uprights 14 and the beams 17, is a relatively narrow platform 19 providing a walkway for the operator of the machine. Conveniently a similar walkway platform 20 is provided on the opposite side of the machine, supported by the other two uprights 14 and by the beams 18 which are secured at their lower ends to the uprights and project outwardly and upwardly therefrom. The supporting framework may include such additional supporting and reinforcing members as are desirable.

It will be seen from Figure 2 that as the cars 12 advance along the track the tables pass first under the apparatus 21 which deposits water thereon, and then under the apparatus 22 which deposits dry plaster of Paris onto the wetted table tops.

The function of the apparatus 21 is to charge successive increments of the tables 13 with a measured amount of water distributed uniformly across the table top as it advances under the apparatus. In the illustrative embodiment the water is sprayed on the table surface, and preferably this is done by using one or more flat-spray-pattern nozzles arranged with the plane of the spray normal to the direction of movement of the tables. Ordinarily a more uniform distribution of the water can be obtained by using several spray nozzles spaced transversely of the table so that their spray patterns cover the entire width of the table without substantially overlapping, and whether one or more spray nozzles is used will depend on the width of the table, the height of the nozzles above the table top, the water pressure, and other factors.

The machine of the illustrative emobdiment is designed for operation in three different ranges of table speeds. The spray nozzles should be located a distance above the table which will insure substantially uniform distribution of water transversely of the table with a minimum of splashing and a minimum of movement of the water after it is deposited on the table. The greater the speed of the cars, the greater the volume of water which must be applied to the table in a given length of time. For reasons of economy it will be desirable to use the same water supply and water pressure for all table speeds, and consequently the spray nozzles which are to be used at the different table speeds will have different flow characteristics. It has been found desirable to locate the nozzles for the different table speeds at different heights above the table.

Ordinarily it will be desirable to use an accelerator to shorten the setting time of the plaster of Paris, so as to permit a higher car speed, or a closer spacing of the plaster applicator to the grinding and polishing apparatus. Potassium sulfate or sodium sulfate may be added to the water, or lime water may be used. If lime water is used, there is the possibility of gradual clogging of the spray nozzles by an accumulation of lime. For that reason it may be desirable to have a standby set of spray nozzles for each table speed, so that in the event of any substantial diminution of water flow the standby set of spray nozzles can be substituted for those in use merely by actuating suitable valve mechanism without interrupting the operation of the machine. The nozzles thus cut out of service can then be disconnected and removed from the water applicator 21 for cleaning, after which they can be replaced to serve as the standby set.

In the illustrative embodiment, two sets of spray nozzles are provided for each of the three ranges of table speeds for which the machine is designed, and each set comprises three spray nozzles spaced transversely of the table surface. It will be understood from the foregoing description that it is intended that only one set of spray nozzles will be in use at a time, and in a machine in which the table speed is kept within a narrow range a single set of spray nozzles may suffice. As can best be seen in Figure 2, the spray nozzles 24, intended for use at table speeds in the range of about 80 to 120 inches per minute, are attached to the ends of short lengths of tubing 25 depending from the supply manifolds 26, which extend transversely of the table and will be connected at one end through suitable couplings and valves to a pipe supplying water under pressure. A separate manifold is employed for each set of spray nozzles. The spray nozzles 27, intended for use at table speeds in the range of about 120 to 160 inches per minute, are attached to the ends of somewhat longer lengths of tubing 28, connected to the supply manifolds 29. The spray nozzles 30, intended for use at table speeds in the range of about 160 to 200 inches per minute, are on the ends of still longer lengths of tubing 31, connected to the supply manifolds 32.

Preferably the supply manifolds 26, 29 and 32 rest in a rack 84 from which any one of them may be easily lifted when it becomes necessary to clean the spray nozzles. By attaching the spray nozzles 24, 27 and 30 on the ends of the lengths of tubing 25, 28 and 31, respectively, rather than directly on the supply manifolds 26, 29 and 32, it is possible to locate all of the supply manifolds side by side in a single rack, while having the spray nozzles for different table speeds located at different heights above the table. By using flexible copper tubing for the connections 25, 28 and 31, it will be possible to adjust the positions of the spray nozzles slightly relative to each other by bending the connections, so as to insure uniform distribution of the water transversely of the table.

As the coupled cars 12 move under the spray nozzles of the water applicator 21, successive increments of the tables 13 have a measured quantity of water deposited thereon, the quantity depending on the speed of the cars, the flow characteristics of the spray nozzles, and the water pressure. The quantity of water to be deposited on the table surface is more than the stoichiometric quantity required for reaction with the subsequently applied dry plaster of Paris to cause it to set. The extra water permits flow of the plaster mix when the glass plate is laid thereon and rolled, so that no voids will remain and a truly horizontal placement will be obtained. The water will be evenly distributed transversely of the tables by the spray nozzles, so that the entire table top is uniformly wetted as it moves under the water applicator. The moving cars then carry the wetted tables under the apparatus 22 which deposits a measured quantity of dry plaster of Paris on successive increments of the table surface. It is important that the wet plaster bed thus formed on the tables for receiving and holding sheets of glass be of uniform thickness and consistency, so that the plaster will set quickly and uniformly, and so that the entire under surface of each sheet of glass will be in direct contact with the plaster. To this end, the dry plaster of Paris should be deposited in a thin film distributed uniformly over the wetted table top.

Any splashing of water into the dry plaster of Paris as it is being deposited on the table might result in the formation of lumps of plaster which, falling on the table surface and perhaps rolling thereon, would impair the uniformity of the plaster bed. Splashing of water from the spray nozzles or from the table top onto the dry plaster applicator mechanism might result in the accumulation thereon of wet plaster which would be likely to break free from time to time and fall in lumps onto the table. In order to minimize these dangers, the water applicator 21 and the plaster applicator 22 are separated from each other by a splash guard 33 which extends the full width of the moving tables, and from above the level of the spray nozzles to within a short distance of the surface of the advancing tables, for example about one-quarter inch. Conveniently this splash guard comprises a vertically arranged metal sheet which is disposed close to the spray nozzles of the water applicator. A similar splash guard may be disposed immediately ahead of the water applicator 21, as shown at 34.

Details of the construction of the dry plaster of Paris applicator 22 are disclosed in Figures 1, 3 and 4 of the drawings. Spanning the line of advancing tables and spaced thereabove is a relatively narrow housing designated generally at 35. The length of this housing is slightly greater than the width of the tables. As may be seen in Figure 3, the lower part 36 of the housing substantially conforms to the peripheral contour of a cylindrical brush 38 extending substantially the full length of the housing, and the side walls 37 of the housing extend vertically above the horizontal plane through the longitudinal axis of the brush. With the construction as shown, spaces within the housing where dry plaster of Paris could accumulate and become packed into hard chunks are reduced to a minimum, and dry plaster of Paris fed onto the top of the brush, in the manner hereinafter described, will be carried around and down by the brush to be deposited on the tables.

In the bottom of the housing 35, extending the full width of the table surface, is a relatively narrow, wire mesh screen 39 through which the dry plaster of Paris is sifted onto the advancing tables. As the brush 38 rotates, the ends of the bristles move over the screen 39 and there is a peening action between the ends of the bristles and the wires of the screen. This peening action shakes loose the dry plaster of Paris carried by the bristles and causes it to drop through the screen onto the tables advancing thereunder. This peening action is effective to prevent accumulation of impacted dry plaster of Paris in the brush, and an even feeding of the dry plaster of Paris through the screen onto the table surface is made possible.

The screen 39 desirably is stretched taut in order to realize fully the peening effect with the bristles. In the illustrative embodiment the longitudinal edges of the screen are permanently secured to cleat-like side members 41, which are clamped against the bottom of the applicator housing 35 by a screen retainer 42 which is removably secured to the bottom of the housing, as by screws 44. Desirably the side members 41 of the screen and the screen retainer 42 are provided with cooperating beveled edges as shown at 43, so that as the screen retainer is drawn up against the bottom of the housing by the screws 44, the retainer forces the side members apart to place the screen under tension.

If dry plaster of Paris is fed into the applicator housing 35 at a rate faster than it is discharged through the screen 39, the plaster of Paris may become impacted in the brush. Such lodging of plaster of Paris in the brush may result in an uneven discharge of the plaster of Paris through the screen, and also may require frequent cleaning of the brush. In order to minimize the likelihood of this happening, the dry plaster of Paris is fed intermittently in relatively small measured amounts directly onto the top of the rotating brush.

As can be seen in Figure 3, the means for feeding the dry plaster of Paris onto the brush 38 comprises an open bottom bin 45 which is centered directly over the brush and extends the full width of the table surface. Preferably this bin is substantially narrower than the diameter of the brush and its side walls are vertical so as to afford no spaces in which the dry plaster of Paris can accumulate and form into hard lumps.

Secured along the lower edges of the side walls of the bin 45, which extend downwardly to within a short distance above the surface of the brush 38, are scraper blades 46, 47 extending the full length of the bin. These scraper blades are vertically adjustable so that they can be made to clear the ends of the brush bristles, or so that they can be made to engage the ends of the bristles. Adjustability of the scraper blades conveniently is accomplished by means of vertically disposed slots 48 therein, which fit over spaced, screw-threaded studs 49 mounted along the lower edges of the side walls of the bin 45, the scraper blades being clamped in adjusted position by wing nuts 50. If the tables are of the order of 10 to 12 feet wide, and the scraper blade was made in one piece, it would be virtually impossible for one man to adjust the blade with the requisite accuracy. In order to facilitate adjustment of the scraper blades by a single operator, the blades preferably are made not more than about two feet long, and are arranged in abutting end-to-end relation so as to provide continuous scraper edges extending the full length of the bin. Access to the interior of the applicator housing 35 for the purpose of adjusting the scraper blades may be had by lifting the hinge flaps 51 which are mounted on the outer side walls of the bin and which, in lowered position, constitute a closure for the top of the applicator housing.

When the applicator brush rotates clockwise, as viewed in Figure 3, the scraper blade 46 preferably will be adjusted so that the ends of the brush bristles impinge thereon, the resultant peening action serving to dislodge plaster of Paris which may not have fallen through the screen 39. At the same time, the scraper blade 47 desirably will be adjusted so that there is a slight clearance between its edge and the ends of the bristles, thus permitting a thin uniform layer of plaster of Paris to be carried on the surface of the rotating brush from the bin 45 to the screen 39, where it is scraped and shaken loose from the bristles and walls through the screen onto the tables moving thereunder.

Figure 7:
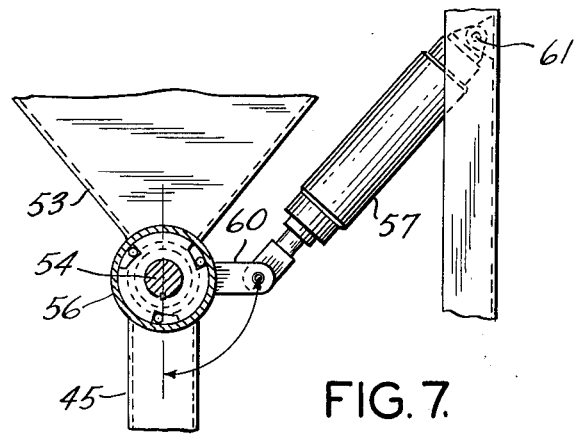
Figure 7 shows further details of mechanism for operating the plaster gate which deposits dry plaster of Paris onto the rotary applicator brush.

Dry plaster of Paris is fed intermittently in measured amounts onto the top of the brush 38 by a plaster gate located within the connection between the lower bin 45 and the upper bin 53. In the illustrative embodiment this plaster gate comprises a shaft 54 extending the full length of the bin and having four radially disposed blades secured thereon, as by welding, located within a cylindrical housing formed at the adjoining portions of the lower bin 45 and the upper bin 53. When the machine is in operation, the shaft 54 is turned intermittently, a quarter of a turn at a time, always in the same direction, by a one-way rotary clutch 56 located outside of the bins at one end of the plaster gate. One type of clutch is shown more or less diagrammatically, by way of example, in Figure 7. Rotary motion of the outer shell of the clutch by the clutch actuating arm 60 in one direction will turn the shaft 54, while rotary motion of the shell in the other direction will not turn the shaft.

Suitable clutch actuating and timing mechanism is provided to insure that the correct amount of dry plaster of Paris will be fed onto the top of the brush. As shown, the actuating mechanism for the clutch is an air cylinder 57, the ram of which is pivotally connected to the clutch actuating arm 60, and the cylinder of which is pivotally secured at 61 to the framework which supports the plaster applicator. Operation of the air cylinder may be governed by a solenoid air valve and suitable electric timer control mechanism synchronized with the speed of rotation of the brush so as to supply the correct amount of dry plaster of Paris to the lower bin 45 for all operating speeds.

The upper bin 53 is co-extensive in length with the lower bin 45, but preferably is made somewhat wider so as to provide storage space for dry plaster of Paris. The dry plaster of Paris may be fed mechanically to the upper bin, and in the drawings a motor driven screw conveyor 58 is shown for transferring dry plaster of Paris from a source of supply, not shown, to a point midway of the length of the bin, where it is discharged into the bin through a down spout 59. The dry plaster of Paris can be spread lengthwise of the upper bin manually, for example by a paddle wielded by the operator of the machine standing on the platform 20, thus insuring a continuous supply of plaster of Paris along the entire length of the plaster gate 52. If, for example, the tables are 11 feet wide, and the desired thickness of the plaster bed is .006 inch, and the table speed is 200 inches per minute, the quantity of dry plaster of Paris required will be approximately 5.5 cubic feet per hour.

Details of construction of the cylindrical brush 38 are disclosed in Figures 1, 3 and 4. As indicated hereinabove, the width of the tables may be of the order of 10 to 12 feet. In order to attain a uniform discharge of dry plaster of Paris through the screen across the full width of the tables it is important that the brush be constructed so that there will be a minimum of sag in the brush between its end bearings when the brush is in the applicator. In the illustrative embodiment the brush comprises a steel tube 62, on the ends of which are rigidly secured the brush holders 63. The bristles, made for example of nylon, are stiff to insure effective peening action against the screen 39, and are closely spaced on the tube so that the dry plaster of Paris will be carried largely by the outer ends of the bristles.

As the ends of the bristles move over the screen 39 they will be bent slightly, and in the course of time the bristles may take a set which tends to lessen the peening effect and thus reduce the amount of dry plaster of Paris discharged through the screen. For this reason it is desirable that the driving mechanism for the brush be reversible, so that after the brush has been rotated in one direction until the bristles begin to acquire a set, the rotation of the brush can be reversed. When this is done it will be necessary, of course, to reverse the adjustments of the scraper blades 46 and 47.

A more effective peening action between the bristles and the screen 39 will be obtained, and with less tendency for the bristles to acquire a set, if the brush is simultaneously oscillated along its longitudinal axis as it is rotated. As can best be seen in Figure 4, the brush holders 63 have substantially the same diameter as the outside of the brush and are rotatably supported in bushings 64, for example graphited bronze, secured in the bushing end plates 65, so that the brush is free to move longitudinally as well as to rotate with respect to the bushing end plates. As can be seen in Figure 5, these bushing end plates are secured by cap screws 66 against the housing end plates 67 at the ends of the applicator housing 35. The driving mechanism for the brush will be described hereinafter.

Since the dislodgment of dry plaster of Paris from the brush and its uniform discharge through the screen 39 is dependent in part on the peening action between the bristles and the screen, it is desirable to be able to adjust the brush vertically with respect to the screen, both initially and as the bristles wear down. An arrangement permittting vertical adjustment of the bushing end plates 65 with respect to the housing end plates 67 is illustrated in Figures 4 and 5. The housing end plate 67 is provided at its top and bottom edges with outwardly projecting lugs 69, 70, which carry the vertical adjusting screws 71, 72, respectively. The ends of the adjusting screws 71, 72 bear against the top and bottom edges, respectively, of the bushing end plate 65. By loosening the cap screws 66, which pass through vertically disposed slots 68 in the bushing end plate 65, the bushing end plate can be adjusted vertically by means of the adjusting screws 71, 72. The screws 66 can then be retightened to hold the brush in its adjusted vertical position.

Details of the brush driving mechanism are disclosed in Figures 1, 4 and 6. The driving connection to the brush is made to one end of the brush shaft 73 projecting beyond one of the brush holders 63, in which the shaft is rigidly secured. Firmly secured on the outer end of the shaft 73 is a universal joint 74. The other end of the universal joint is rigidly connected to one end of a short shaft 75, which is rotatably mounted in thrust bearings 77 in one end of an elbow-shaped connecting arm 78. The shaft 75 is driven, through miter gears 82, by the wrist pin 80 of a crank 79, the wrist pin being rotatably mounted in thrust bearings 81 in the other end of the elbow-shaped connecting arm 78, at right angles to the shaft 75. As can be seen in Figure 6, the wrist pin 80 is offset with respect to the driving shaft 83, on which the crank is rigidly secured.

Upon rotation of the driving shaft 83, the rotation of the wrist pin 80 within its bearings in the connecting arm 78 will cause the shaft 75 to rotate, and this in turn will cause the brush of the plaster applicator to rotate about its longitudinal axis. At the same time, the crank 79 will cause the connecting arm 78 to oscillate toward and away from the end of the applicator housing 35, and the brush holders 63 will slide as they rotate in their bushings 64. It will be evident that this produces an oscillation of the brush 38 along its longitudinal axis as it rotates.

The driving shaft 83 preferably is reversible, so that the applicator brush can be driven in either direction. Desirably the speed of the driving shaft is variable, so that the amount of dry plaster of Paris deposited on successive increments of the advancing table surface can be readily adjusted to the table speed. Conveniently the driving means 85 is a reversible electric motor embodying a variable, speed reducing mechanism which can be adjusted to produce the desired shaft speed, which will be in the range of about 4 to 20 R. P. M. for the machine of the illustrative embodiment. One suitable drive is the "Varidrive" motor manufactured by U. S. Electrical Motors, Inc.

In operation, the coupled cars 12 advance along the track 11, passing first under the water applicator 21 which charges successive increments of the table with a measured amount of water distributed uniformly over the table surface, and then under the plaster applicator 22, which charges successive increments of the wetted table surface with a uniform thin layer of dry plaster of Paris. The plaster bed thus formed on the continuously moving table surface is uniform in thickness and in consistency. As the tables move from under the plaster applicator, sheets of glass will be laid on the wet plaster bed and will be carried by the cars to the grinding and polishing machines.

In the illustrative embodiment all of the water is applied to the table surface, after which the dry plaster of Paris is deposited on the wetted table. While this is the preferred arrangement, a part of the water could be applied after the dry plaster of Paris has been spread on the table, for example by providing a second water applicator following the plaster applicator 22.

It will be evident from the foregoing description that a method and apparatus have been provided for continuously laying a uniform plaster bed on the advancing tables, and that the plaster bed is laid mechanically and without preliminary mixing of the water and the dry plaster of Paris.

It will be understood that the invention herein described may be modified and embodied within the scope of the subjoined claims.

I claim:

1. The method of laying a bed of plaster on a flat surface which comprises the steps of depositing a measured quantity of water, uniformly distributed, on the surface, and depositing a measured quantity of dry plaster of Paris, uniformly distributed, into the water which has been deposited on the surface.

2. The method of continuously laying a bed of plaster on an elongated flat surface which comprises the steps of charging successive increments of the elongated surface with a measured amount of water uniformly distributed transversely of the elongated surface, and then charging successive increments of the wetted surface with a measured amount of dry plaster of Paris uniformly distributed transversely of the elongated surface.

3. The method of claim 2, including charging the surface with an amount of water sufficient to cause the subsequently applied dry plaster of Paris to set.

4. The method of continuously laying a bed of plaster on a moving surface which comprises the steps of separately depositing a uniform amount of water and a uniform amount of dry plaster of Paris on successive increments of the moving surface.

5. The method of laying a uniform bed of plaster on an elongated flat surface wihch comprises the steps of advancing the elongated surface at a constant speed, charging successive increments of the advancing surface with a measured amount of water, and then sifting a substantially continuous uniform film of dry plaster of Paris onto the wetted surface.

6. The method of laying a uniform bed of plaster on a continuously moving surface which comprises the steps of spraying a uniform covering of water onto the moving surface, and then depositing a uniform film of dry plaster of Paris onto the wetted surface.

7. The method of laying a uniform bed of plaster on a continuously moving surface which comprises the steps of spraying a uniform covering of water onto the moving surface, and then sifting a uniform film of dry plaster of Paris onto the wetted surface.

8. The method of laying a uniform bed of plaster on a relatively moving surface which comprises the steps of continuously depositing water on the surface substantially uniformly across its dimension normal to the direction of movement, and promptly thereafter depositing a uniform thin film of dry plaster of Paris into the water on the moving surface.

9. Apparatus for continuously laying a bed of plaster on an elongated flat surface comprising, in combination, first means for continuously advancing the elongated surface, second means bridging across said first means for depositing a uniform covering of water on successive increments of the advancing surface, and third means bridging across said first means beyond said second means in the direction of advancement of the elongated surface for depositing a uniform film of dry plaster of Paris on successive increments of the wetted surface.

10. Apparatus according to claim 9, including a splash guard located between and separating the second mentioned means and the third mentioned means, the splash guard extending across the elongated surface and into close proximity thereto.

11. Apparatus according to claim 9, in which the means for depositing the water on the elongated surface comprises a spray nozzle.

12. Apparatus according to claim 9, in which the means for depositing the water on the elongated surface comprises a flat-spray-pattern nozzle arranged with the plane of the spray pattern normal to the longitudinal axis of the elongated surface.

13. Apparatus according to claim 9, in which the means for depositing the water on the elongated surface comprises a water supply manifold arranged transversely over the elongated surface, a plurality of outlet pipes depending from said manifold, spaced therealong, and a spray nozzle on the lower end of each outlet pipe.

14. Apparatus according to claim 9, in which the means for depositing the dry plaster of Paris on the elongated surface comprises a screen which sifts the dry plaster of Paris onto the wetted surface.

15. Apparatus according to claim 9, in which the means for depositing the dry plaster of Paris on the wetted surface comprises a relatively narrow housing arranged transversely over the elongated surface, a sifting screen in the bottom of the housing, and means for continuously feeding dry plaster of Paris from the housing through the screen at a uniform rate.

16. Apparatus for continuously laying a bed of plaster on an elongated flat surface comprising, in combination, means for depositing a uniform covering of water on successive increments of the elongated surface, and means for depositing a uniform film of dry plaster of Paris on successive increments of the wetted surface, said last mentioned means comprising a relatively narrow housing arranged transversely over the elongated surface, a sifting screen in the bottom of the housing, and means for continuously feeding dry plaster of Paris from the housing through the screen at a uniform rate, the plaster feeding means comprising a rotary cylindrical brush extending longitudinally of the housing with the ends of the brush bristles in contact with the top surface of the screen.

17. Apparatus according to claim 16, in which the lower part of the housing substantially conforms to the peripheral contour of the lower half of the brush, and in which the side walls of the housing extend vertically above the horizontal plane through the longitudinal axis of the brush.

18. Apparatus according to claim 17, including means for regularly feeding measured amounts of dry plaster of Paris onto the top surface of the brush as it is rotated.

19. Apparatus according to claim 18, including a scraper blade extending longitudinally of the brush within the housing, and means for adjusting the scraper blade relative to the brush.

20. Apparatus for continuously laying a bed of plaster on an elongated flat surface comprising, in combination, means for depositing a uniform covering of water on successive increments of the elongated surface, and means for depositing a uniform film of dry plaster of Paris on successive increments of the wetted surface, said last mentioned means comprising a relatively narrow housing arranged transversely over the elongated surface, a sifting screen in the bottom of the housing, a cylindrical brush extending longitudinally of the housing with the ends of the brush bristles in contact with the top surface of the screen, and means for simultaneously rotating the brush and oscillating the brush along its longitudinal axis.

21. Apparatus for depositing a uniform layer of dry plaster of Paris on a relatively moving surface comprising, in combination, a relatively narrow housing having a semi-cylindrical bottom and side walls extending vertically therefrom, a cylindrical brush rotatably mounted in the semi-cylindrical bottom part of the housing, a relatively narrow screen in the bottom of the housing extending longitudinally thereof beneath the brush, the length of the screen being equal to the width of the surface over which the plaster of Paris is to be deposited, and means for rotating the brush within the housing.

22. Apparatus according to claim 21, including means for simultaneously oscillating the brush along its longitudinal axis as it is rotated.

23. Apparatus according to claim 21, including means for adjusting the brush vertically relative to the screen.

24. Apparatus according to claim 21, including a supply bin located above the housing, and intermittently actuated gate mechanism for feeding measured amounts of dry plaster of Paris from the bin onto the top of the brush as the brush is rotated.

25. Apparatus according to claim 21, including a scraper blade extending longitudinally of the brush within the housing, and means for adjusting the scraper blade toward and away from the brush.

26. Apparatus according to claim 21, including two scraper blades extending longitudinally of the brush within the housing, said scraper blades being located above the horizontal plane through the longitudinal axis of the brush and on opposite sides of the vertical plane through the longitudinal axis of the brush, means for feeding dry plaster of Paris onto the top of the brush between the scraper blades, and means for individually adjusting the scraper blades toward and away from the brush.

References Cited in the file of this patent

UNITED STATES PATENTS

| | | |
|---|---|---|
| 354,543 | Eberhardt | Dec. 21, 1886 |
| 792,854 | Schulte | June 20, 1905 |
| 1,194,520 | Lewis | Aug. 15, 1916 |
| 1,589,787 | Butter | June 22, 1926 |
| 2,163,687 | Jacobsen | June 27, 1939 |
| 2,212,351 | Moran et al. | Aug. 20, 1940 |